US008296047B2

(12) United States Patent
Sugawara et al.

(10) Patent No.: US 8,296,047 B2

(45) Date of Patent: Oct. 23, 2012

(54) TRAFFIC INFORMATION PROCESSING APPARATUS, TRAFFIC INFORMATION MANAGEMENT SERVER, TRAFFIC INFORMATION MANAGEMENT SYSTEM

(75) Inventors: Aiko Sugawara, Minato-ku (JP); Tadafumi Nogawa, Minato-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 342 days.

(21) Appl. No.: 12/668,347

(22) PCT Filed: Jul. 3, 2008

(86) PCT No.: PCT/JP2008/001767

§ 371 (c)(1), (2), (4) Date: Jan. 8, 2010

(87) PCT Pub. No.: WO2009/008139

PCT Pub. Date: Jan. 15, 2009

(65) Prior Publication Data

US 2010/0198454 A1 Aug. 5, 2010

(30) Foreign Application Priority Data

Jul. 11, 2007 (JP) ................................ 2007-182494

(51) Int. Cl.

*G08G 1/00* (2006.01)
*G08G 1/052* (2006.01)
*G08G 1/127* (2006.01)
*G06F 7/00* (2006.01)
*G08G 1/01* (2006.01)
*G08G 1/13* (2006.01)
*G01C 21/26* (2006.01)

(52) U.S. Cl. ......................... 701/119; 701/117; 701/118

(58) Field of Classification Search ........... 701/117–119
See application file for complete search history.

(56) References Cited

U.S. PATENT DOCUMENTS 6,061,625 A * 5/2000 Fastenrath .................... 701/117
(Continued)

FOREIGN PATENT DOCUMENTS

JP 2003-203243 7/2003
(Continued)

OTHER PUBLICATIONS

BS Kerner, C. Demir, RG Herrtwich, SL Klenov, H. Rehborn, M. Aleksi, and A. Haug. Traffic state detection with floating car data in road networks, In Intelligent Transportation Systems, 2005. Proceedings. 2005 IEEE, pp. 700-705, 2005.*

(Continued)

*Primary Examiner* — Khoi Tran
*Assistant Examiner* — Dale Moyer
(74) *Attorney, Agent, or Firm* — Nelson Mullins Riley & Scarborough LLP; Anthony A. Laurentano

(57) ABSTRACT

Provided is an apparatus and the like for improving the communication efficiency of travel information and the like by taking account of the degree of necessity of collecting the travel information of a vehicle in view of an operating state or attribute of the vehicle. A traffic information processing apparatus (10) mounted in the vehicle (1) determines the travel information thereof and transmits the travel information intermittently to a traffic information management server (20). A transmission interval (T) for transmitting the travel information is set according to a velocity (V) indicating the operating state of the vehicle (1) and a rule designated by the traffic information management server (20).

8 Claims, 3 Drawing Sheets

U.S. PATENT DOCUMENTS

| | | | | |
|---|---|---|---|---|
| 6,092,020 | A * | 7/2000 | Fastenrath et al. | 701/119 |
| 6,426,709 | B1 * | 7/2002 | Becker et al. | 340/992 |
| 7,010,289 | B2 * | 3/2006 | Jijina et al. | 455/412.1 |
| 8,112,219 | B2 * | 2/2012 | Johnson et al. | 701/117 |
| 2010/0161205 | A1 * | 6/2010 | Kim et al. | 701/118 |

FOREIGN PATENT DOCUMENTS

| | | |
|---|---|---|
| JP | 2004-220262 | 8/2004 |
| JP | 2004-233192 | 8/2004 |
| JP | 2004-280521 | 10/2004 |
| JP | 2004-287724 | 10/2004 |

OTHER PUBLICATIONS

International Search Report for Application No. PCT/JP2008/001767, dated Aug. 5, 2008.

* cited by examiner

| VEHICULAR VELOCITY V | TRANSMISSION INTERVAL T |
|---|---|
| $V_1 \leq V \leq V_2$ | $T_1$ |
| $V < V_1$, $V_2 < V$ | $T_2$ ($> T_1$) |
| FROM $V < V_1$ TO $V < V_1 + \Delta V_1$ | $T_2$ |
| FROM $V > V_2$ TO $V > V_2 - \Delta V_2$ | $T_2$ |

| | |
|---|---|
| TRAVEL INFORMATION | |
| LATITUDE INFORMATION | 31 |
| LONGITUDE INFORMATION | 32 |
| DIRECTION INFORMATION | 33 |
| VELOCITY INFORMATION | 34 |
| OTHER VEHICULAR INFORMATION (MILEAGE INFORMATION, ETC) | 35 |
| TIME | 36 |
| COLLECTION INTERVAL INFORMATION | 37 |

TRAFFIC INFORMATION PROCESSING APPARATUS, TRAFFIC INFORMATION MANAGEMENT SERVER, TRAFFIC INFORMATION MANAGEMENT SYSTEM

RELATED APPLICATIONS

This application is a 35 U.S.C. 371 national stage filing of International Application No. PCT/JP2008/001767, filed Jul. 3, 2008, which claims priority to Japanese Patent Application No. 2007-182494 filed on Jul. 11, 2007 in Japan. The contents of the aforementioned applications are hereby incorporated by reference.

PRIORITY CLAIM

The present application is based on and claims the priority benefit of Japanese Patent Application 2007-182494 filed on Jul. 11, 2007, the contents of which are incorporated herein by reference in its entirety.

BACKGROUND OF THE INVENTION

1. Field of the Invention

The present invention relates to a traffic information processing apparatus mounted in a vehicle for determining intermittently travel information of the vehicle, storing and transmitting the travel information, and the like.

2. Description of the Related Art

There has been disclosed a system which analyzes data (FCD) on position information and the like collected from a floating car (or probe car) and supports a plurality of vehicles to travel smoothly by using the analysis result. In order to accumulate or transmit efficiently data denoting a travel trajectory of a vehicle as the FCD, there has been disclosed an art to reduce the data amount (refer to Japanese Patent Laid-open No. 2003-203243). Further, there has been disclosed a travel trajectory data transmitting method for transmitting correctly a travel trajectory of a probe car while reducing the data amount of the FCD in a floating car system (refer to Japanese Patent Laid-open No. 2004-280521).

However, it is possible that the travel information is collected with the collecting frequency for the travel information of a vehicle remained unchanged despite that the degree of necessity of collecting the travel information of the vehicle is estimated to be low in view of an operating state or attribute of the vehicle, therefore, there is a limitation on the efficiency for communicating and storing the travel information.

SUMMARY OF THE INVENTION

The present invention has been accomplished in view of the aforementioned problems, and it is therefore an object of the present invention to provide an apparatus and the like for improving the communication efficiency of travel information and the like by taking account of the degree of necessity of collecting the travel information of a vehicle in view of an operating state or attribute of the vehicle.

According to a first aspect of the present invention, there is provided a traffic information processing apparatus which is mounted in a vehicle and is provided with a first processing element configured to determine travel information of the vehicle and transmit the travel information intermittently. The traffic information processing apparatus further comprises a second processing element configured to set a transmission interval according to an operating state or an attribute of the vehicle for the first processing element to transmit the travel information.

According to the traffic information processing apparatus of the first aspect of the present invention, the travel information is transmitted at a transmission interval or frequency related to the operation state or attribute of the vehicle. Therefore, it is expected to improve the communication efficiency of the travel information and the like by taking account of the degree of necessity of collecting the travel information of the vehicle in view of the operating state or attribute of the vehicle.

A second aspect of the present invention is dependent on the first aspect of the present invention, wherein the second processing element sets the transmission interval when a velocity of the vehicle denoting the operating state of the vehicle is in a predefined range different from that when the velocity thereof is beyond the predefined range.

According to the traffic information processing apparatus of the second aspect of the present invention, it is expected to improve the communication efficiency of the travel information and the like by taking into consideration that the degree of necessity of collecting the travel information of the vehicle varies when the velocity of the vehicle is in and beyond the predefined range.

A third aspect of the present invention is dependent on the second aspect of the present invention, wherein the second processing element sets the transmission interval longer when the velocity of the vehicle is beyond the predefined range than that when the velocity thereof is in the predefined range.

According to the traffic information processing apparatus of the third aspect of the present invention, it is expected to improve the communication efficiency of the travel information and the like with the transmission interval set in consideration that the degree of necessity of collecting the travel information of the vehicle is lower when the velocity of the vehicle is beyond the predefined range than that when the velocity thereof is in the predefined range.

A fourth aspect of the present invention is dependent on the second aspect of the present invention, wherein the second processing element sets the transmission interval when the velocity of the vehicle varies in a predefined width inside the predefined range different from that when the velocity thereof varies beyond the predefined width after the velocity thereof is restored to the predefined range.

According to the traffic information processing apparatus of the fourth aspect of the present invention, it is expected to improve the communication efficiency of the travel information and the like with the transmission interval set in consideration that the degree of necessity of collecting the travel information of the vehicle will not change immediately after the velocity of the vehicle is restored to the predefined range from that beyond the predefined range.

A fifth aspect of the present invention is dependent on the fourth aspect of the present invention, wherein the second processing element sets the transmission interval shorter when the velocity of the vehicle varies beyond the predefined width inside the predefined range than that when the velocity thereof varies in the predefined width after the velocity thereof is restored to the predefined range.

According to the traffic information processing apparatus of the fifth aspect of the present invention, it is expected to improve the communication efficiency of the travel information and the like with the transmission interval set in consideration that the degree of necessity of collecting the travel information of the vehicle is higher when the velocity of the vehicle is restored to the predefined range from beyond and varies beyond the predefined width inside the predefined width than that when the velocity thereof varies in the predefined width.

A sixth aspect of the present invention is dependent on the first aspect of the present invention, wherein the second processing element recognizes, according to communication with a traffic information management server, a rule for setting the transmission interval for the travel information according to the operating state or the attribute of the vehicle, and sets the transmission interval according to the operating state or the attribute of the vehicle and the rule.

According to the traffic information processing apparatus of the sixth aspect of the present invention, the transmission interval for the travel information is set according to the rule designated by the traffic information management server. Therefore, the transmission interval for the travel information is adjusted for each vehicle among a plurality of vehicles with the principle regarding the degree of necessity of collecting the travel information from each of the plurality of vehicles reflected to the traffic information management server. Accordingly, it is expected to improve the communication efficiency of the travel information and the like.

According to a seventh aspect of the present invention, there is provided a traffic information management server which receives travel information of a vehicle from a traffic information processing apparatus mounted in the vehicle, wherein the traffic information processing apparatus is provided with a first processing element configured to determine travel information and transmit the travel information intermittently, and a second processing element configured to set a transmission interval according to an operating state or an attribute of the vehicle for the first processing element to transmit the travel information, and the traffic information management server is provided with a first management element for making the second processing element recognize a rule for setting the transmission interval for the travel information according to communication with the traffic information processing apparatus.

According to the traffic information management server of the seventh aspect of the present invention, the travel information can be transmitted to the traffic information processing apparatus at the transmission interval or frequency related to the operation state or attribute of the vehicle. Therefore, it is expected to improve the communication efficiency of the travel information and the like by taking account of the degree of necessity of collecting the travel information of the vehicle in view of the operating state or attribute of the vehicle.

An eighth aspect of the present invention is dependent on the seventh aspect of the present invention further includes a second management element configured to recognize the travel information of the vehicle according to communication with the traffic information processing apparatus, generate road traffic information according to the travel information, and provide the road traffic information to a navigation apparatus mounted in the vehicle or another vehicle.

According to the traffic information management server of the eighth aspect of the present invention, the road traffic information generated on the basis of the travel information which is collected efficiently from a vehicle can be offered to the navigation apparatus mounted in the vehicle or another vehicle. Thereby, by making the navigation apparatus search a recommended route on the basis of the road traffic information and output the information thereof to the driver, the driving of the vehicle by the driver can be supported.

According to a ninth aspect of the present invention, there is provided a traffic information management system composed of the traffic information processing apparatus of the first aspect and the traffic information management server of the seventh aspect of the present invention.

According to the traffic information management system of the ninth aspect of the present invention, it is expected to improve the communication efficiency of the travel information and the like by taking account of the degree of necessity of collecting the travel information of the vehicle in view of the operating state or attribute of the vehicle.

DETAILED DESCRIPTION OF THE PREFERRED EMBODIMENTS

Hereinafter, an embodiment of a traffic information management system according to the present invention will be described in detail with reference to the drawings.

Figure 1:
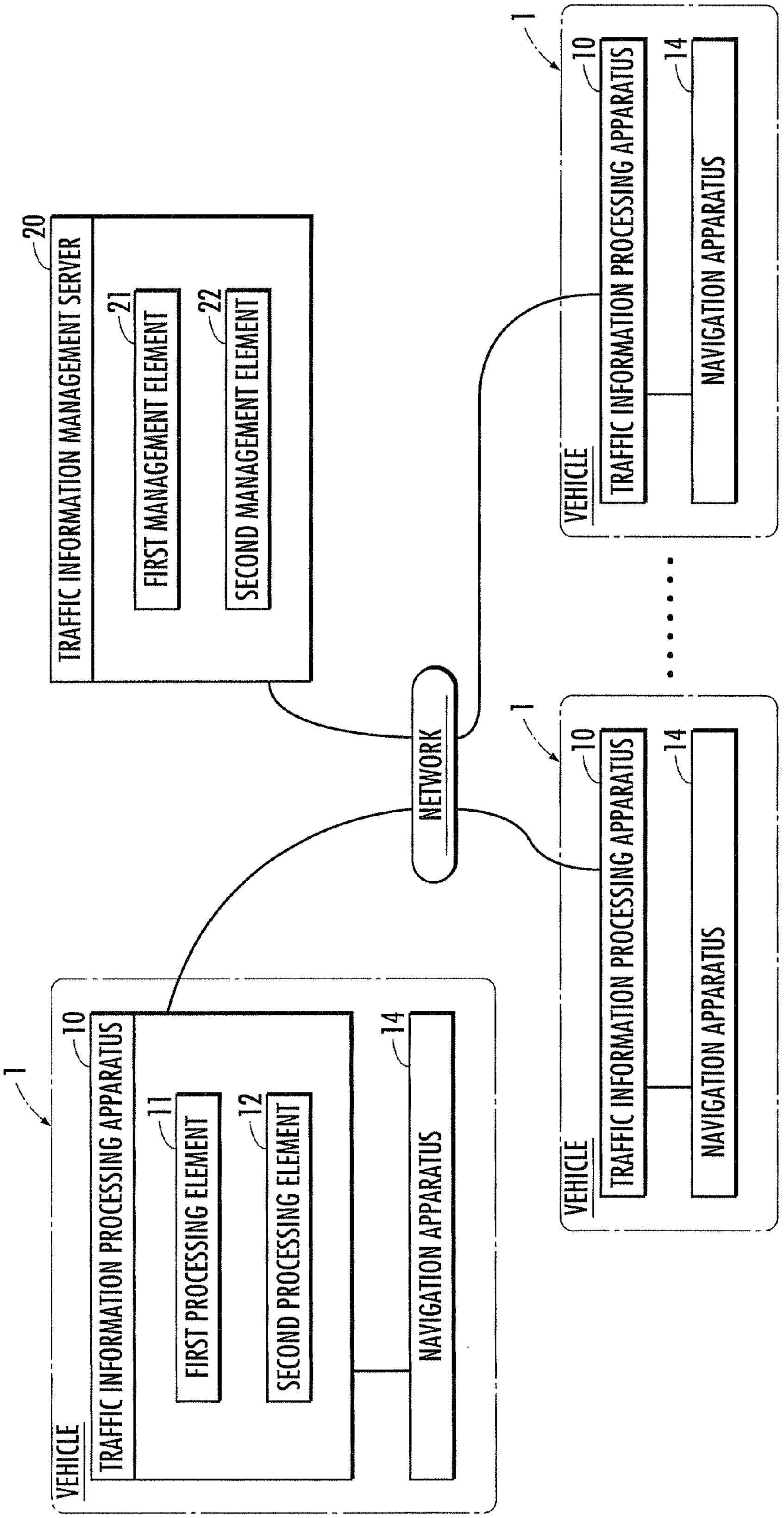
FIG. 1 is an explanatory diagram illustrating configuration of a traffic information management system of the present invention.

First, the description will be given on the structural configuration of the traffic information management system. The traffic information management system as illustrated in FIG. 1 is composed of a traffic information processing apparatus 10 mounted in a vehicle 1, and a traffic information management server 20 capable of intercommunicating with the traffic information processing apparatus 10.

The traffic information processing apparatus 10 may be composed of one ECU (Electronic Control Unit composed of a CPU, a ROM, a RAM, an I/O and the like) or a plurality of ECU connected via a vehicular network or a BUS. The traffic information processing apparatus 10 is provided with a first processing element 11 and a second processing element 12.

The first processing element 11 determines a position, velocity, direction and the like of the vehicle 1 according to functions of a vehicular GPS or outputs from various sensors such a velocity sensor, a gyro sensor in the vehicle 1. The determination result is memorized or stored by the first processing element 11 in a storing device (not shown). Moreover, the first processing element 11 transmits a part of the determination result via a communication device (not shown) as travel information to the traffic information management server 20. The second processing element 12 recognizes a rule for setting an interval designated by the traffic information management server 20 according to communication with the traffic information management server 20 via a communication device. According to the vehicular velocity v determined by the first processing element 11 and the rule, the second processing element 12 sets a transmission interval for the first processing element 11 to transmit the travel information.

The vehicle 1 is further mounted with a navigation apparatus 14. The navigation apparatus 14 is composed of a computer (provided with a CPU, a ROM, a RAM, an I/O and the like). The computer is connected to the ECU constituting the traffic information processing apparatus 10 via a vehicular network. The traffic information processing apparatus 10 and the navigation apparatus 14 may be constituted from a common computer. In addition, the traffic information processing apparatus 10 may be configured as a constituent component of the navigation apparatus 14, or on the contrary, the navigation apparatus 14 may be configured as a constituent component of the traffic information processing apparatus 10.

The navigation apparatus 14 searches a recommended route leading the vehicle 1 to a destination position according to the road traffic information or the like distributed from the traffic information management server 20 to the traffic information processing apparatus 10. The navigation apparatus 14 outputs the circumferential map of the vehicle 1, the recommended route and the like to a display disposed on a center console.

The traffic information management server 20 is provided with a first management element 21 and a second management element 22. The first management element 21 makes the second processing element 12 of the traffic information processing apparatus 10 recognize a rule for setting a determination interval or the like of the travel information according to communication with the traffic information processing apparatus 10 mounted in the vehicle 1. The second management element 22 recognizes the travel information of the vehicle 1 according to communication with the traffic information processing apparatus 10 and stores the travel information in a storing device or a database. Further, the second management element 22 generates the road traffic information on the basis of the travel information. The road traffic information includes travel time needed by an arbitrary vehicle to travel through each of a plurality of links. Furthermore, the second management element 22 provides the road traffic information to the navigation apparatus 14 mounted in the vehicle 1 by addressing the road traffic information to the vehicle 1.

The functions of the traffic information management system with the mentioned configuration will be explained.

Figure 2:
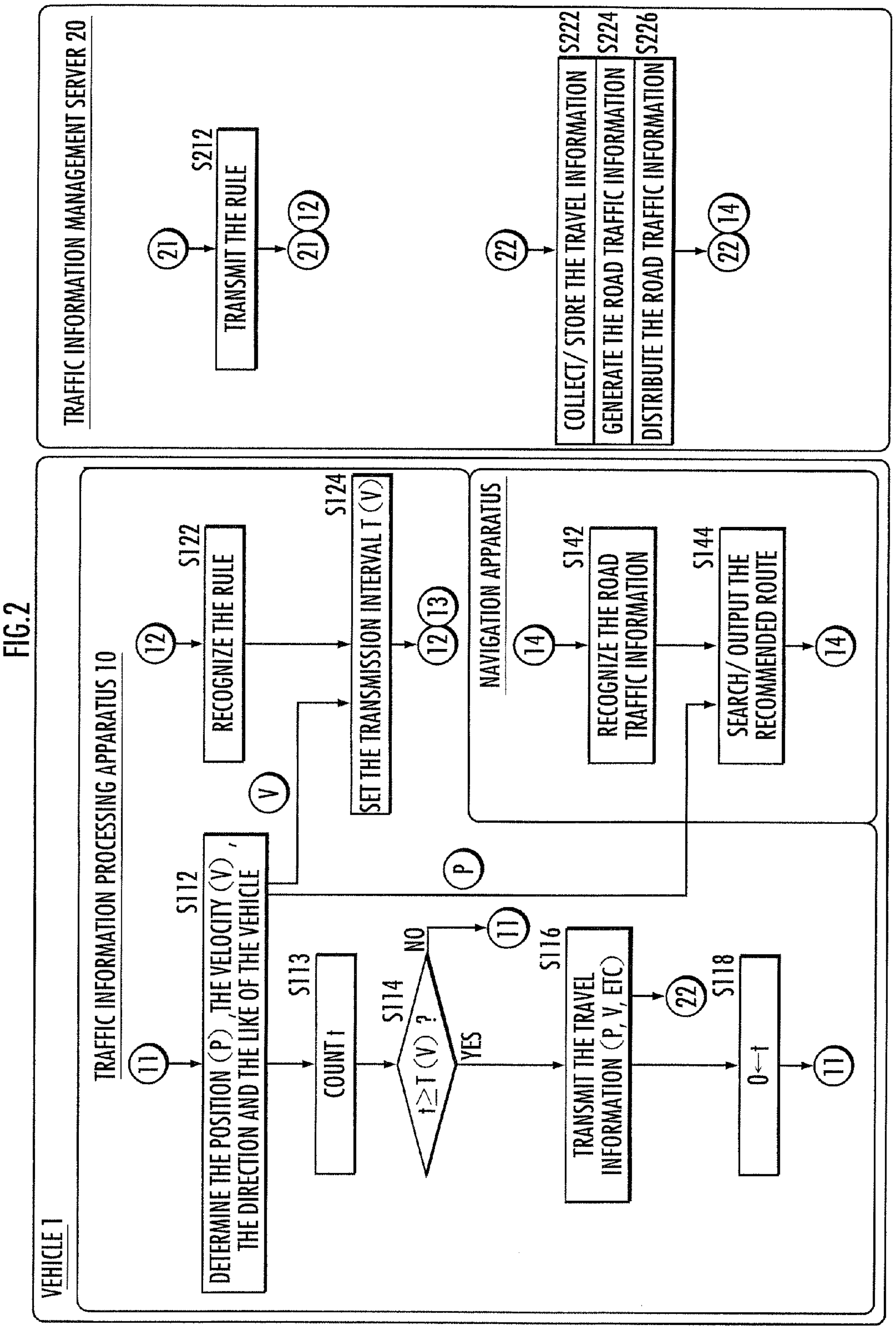
FIG. 2 is an explanatory diagram illustrating functions of the traffic information management system of the present invention.

When a request is transmitted, together with an identification information of the vehicle 1, from the traffic information processing apparatus 10 to the traffic information management server 20, a rule is sent by the first management element 21 to the traffic information processing apparatus 10 mounted in the vehicle 1 recognized according to the identification information (FIG. 2/S212). Thus, the rule is recognized by the second processing element 12 in the traffic information processing apparatus 10 and is stored in a memory or the like (FIG. 2/S122).

Figures 3, 4, 5:
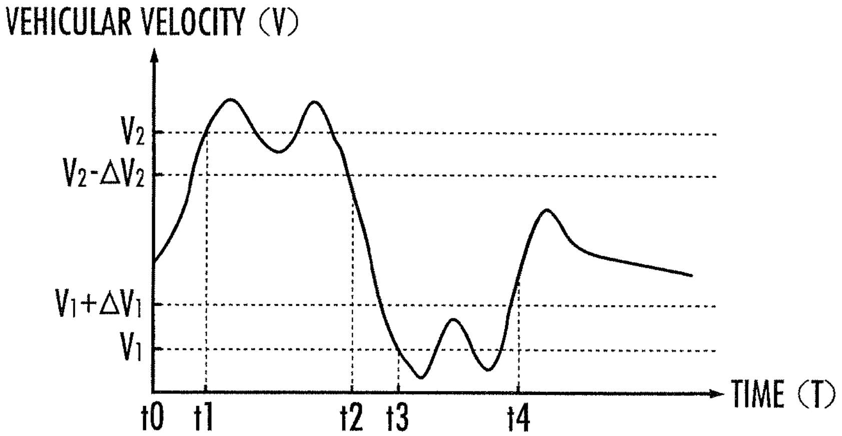
FIG. 3 is an explanatory diagram illustrating a rule for setting a transmission interval.
FIG. 4 is an explanatory diagram illustrating a method for setting a transmission interval.
FIG. 5 is an explanatory diagram illustrating a format for travel information (FCD).

The rule is configured to set the transmission interval T for the first processing element 11 to transmit the travel information according to the vehicular velocity v. For example, the rule illustrated in FIG. 3 is designated by the first management element 21. In other words, when the vehicular velocity v is in a predefined range (from $v_1$ to $v_2$), the transmission interval T is set at the first interval $T_1$ (for example, 3 seconds); however, when the vehicular velocity v is beyond the predefined range, the transmission interval T is set at the second interval $T_2$ (for example, 9 seconds) longer than the first interval $T_1$. Meanwhile, from a time when the vehicular velocity v becomes smaller than the first velocity $v_1$ which is the lower limit of the predefined range to another time when the vehicular velocity v becomes smaller than the first velocity $v_1$ within a first predefined width $\Delta v_1$ (>0) (the vehicular velocity v is varying above the lower limit $v_1$ of the predefined range within the first predefined width $\Delta v_1$), the transmission interval T is maintained at the second interval $T_2$. From a time when the vehicular velocity v becomes greater than the second velocity $v_2$ which is the upper limit of the predefined range to another time when the vehicular velocity v surpasses the second velocity $v_2$ within a second predefined width $\Delta v_2$ (the vehicular velocity is varying below (inside) the upper limit of the predefined range within the second predefined width $\Delta v_2$), the transmission interval T is maintained at the second interval $T_2$.

The first processing element 11 in the traffic information processing apparatus 10 determines the position p (designated by latitude and longitude), the velocity v, the direction (moving direction) and the like of the vehicle (FIG. 2/S112). The second processing element 12 sets the transmission interval T for sending the travel information according to the vehicular velocity v determined by the first processing element 11 and the aforementioned rule (FIG. 2/S124). The transmission interval T is stored in the memory or the like and will be overwritten every time when the transmission interval T is altered.

An example is given in FIG. 4 when the vehicular velocity v varied as illustrated by a solid line. At the time $t_1$ when the vehicular velocity v surpasses the second velocity $v_2$ (beyond the predefined range), the transmission interval T is altered from the first interval $T_1$ to the second interval $T_2$. When the vehicular velocity v is lower than the second velocity $v_2$ but within the second predefined width $\Delta v_2$, the transmission interval T is maintained at the second interval $T_2$. At the time $t_2$ when the vehicular velocity v becomes lower than the second velocity $v_2$ and surpasses the second predefined width $\Delta v_2$, the transmission interval T is altered from the second interval $T_2$ to the first interval $T_1$. Further, at the time $t_3$ when the vehicular velocity v becomes lower than the first velocity $v_1$ (deviated from the predefined range), the transmission interval T is altered from the first interval $T_1$ to the second interval $T_2$. Furthermore, when the vehicular velocity v surpasses the first velocity $v_1$ but within the first predefined width $\Delta v_1$, the transmission interval T is maintained at the second interval $T_2$. While at the time $t_4$ when the vehicular velocity v surpasses the first velocity $v_1$ and beyond the first predefined width $\Delta v_1$, the transmission interval T is altered from the second interval $T_2$ to the first interval $T_1$. Herein, it is acceptable to set the transmission interval T according to acceleration a in addition to or in place of the velocity v of the vehicle 1. For example, it is acceptable that the transmission interval T is maintained at the first interval $T_1$ on condition that the acceleration $\alpha$ is equal to or smaller than a threshold after the vehicular velocity v is lower than the first velocity $v_1$, or the transmission interval T is maintained at the second interval $T_2$ on condition that the acceleration a is equal to or smaller than the threshold after the vehicular velocity v is greater than the second velocity $v_2$.

The first processing element 11 counts an elapsed time t from the previous transmission of the travel information with a timer (not shown) (FIG. 2/S113). Moreover, the first processing element 11 determines whether or not the elapsed time t is equal to the latest transmission interval T stored in the memory which is set by the second processing element 12 (FIG. 2/S114). If the elapsed time t is smaller than the transmission interval T (FIG. 2/S114 . . . NO), the vehicular velocity v or the like is continued to be determined (FIG. 2/S112) and the time is continued to be counted (FIG. 2/S113). If the elapsed time t is equal to the transmission interval T (FIG. 2/S114 . . . YES), the first processing element 11 transmits the travel information to the traffic information management server 20 (FIG. 2/S116) and the time counting is rest to zero (FIG. 2/S118). As described, in the traffic information management server 20, the second management element 22 collects the travel information from a plurality of vehicles 1, and stores or accumulates the travel information in a database (FIG. 2/S222).

In the travel information at the time transmitted, the position p (designated by the latitude and longitude), the vehicular velocity v and the direction of the vehicle 1, additional information such as the fuel consumption, the classification of the road where the vehicle 1 is traveling, the transmission interval T and the like are included. The travel information is formatted as illustrated in FIG. 5. According to the format, the travel information includes a latitude information portion 31 for writing in the latitude, a longitude information portion 32 for the longitude, a direction information portion 33 for the direction, a velocity information portion 34 for the velocity, other vehicular information portion 35 for the mileage information, etc., a time portion 36 for the time and a collection interval portion 37 for writing in the collection interval (the transmission interval T). The collection interval portion 37 can be extended to denote plural types of transmission intervals T.

In the traffic information management server 20, the second management element 22 generates the road traffic information according to the collected travel information (FIG. 2/S224). Thereafter, the second management element 22 distributes the road traffic information to the vehicle 1 identified by the identification information thereof when the identification information and a request for the road traffic information is sent to the traffic information management server 20 by the navigation apparatus 14 through the communication device (FIG. 2/S226). In addition to the road traffic information generated based on the travel information (FCD), the road traffic information distributed to the navigation apparatus 14 may contain the road traffic information made by an external department such as VICS center.

The navigation apparatus 14 recognizes the road traffic information (FIG. 2/S142). Thereafter, the navigation apparatus 14, on the basis of the present position p of the vehicle 1 determined by the first processing element 11, the destination position set by the user and the recognized road traffic information, searches a recommended route to guide the vehicle 1 to the destination position and outputs it to the display device (FIG. 2/S144).

According to the traffic information management system with the aforementioned functions, the travel information is transmitted from the traffic information processing apparatus to the traffic information management server 20 at the transmission interval T in relation to the vehicular velocity v (refer to FIG. 2/S114, S116 and S222). Accordingly, it is expected to improve the efficiency of communicating and storing the travel information by taking account of the degree of necessity of collecting the travel information of the vehicle 1 in view of the velocity v.

More specifically, it is expected to improve the communication efficiency of the travel information of the vehicle 1 by taking into consideration that the degree of necessity of collecting the travel information thereof varies when the vehicular velocity v is in and beyond the predefined range.

For example, when the vehicular velocity v is in a range from a velocity lower than the first velocity $v_1$ to a velocity with the first predefined width $\Delta v_1$ added to the first velocity $v_1$, namely $v_1+\Delta v_1$, the transmission interval T is set at the second interval $T_2$ longer than the first interval $T_1$ (refer to FIG. 3 and FIG. 4). This is based on the estimation or prediction that the vehicle 1 is travelling at a low velocity due to a reason that the vehicle 1 is involved in a traffic jam or the like in the above duration, and consequently, it is acceptable that the transmission frequency of the travel information is low. It is acceptable to use the acceleration a of the vehicle 1 to verify the estimation.

When the vehicular velocity v is in a range from a velocity greater than the second velocity $v_2$ to a velocity with the second predefined width $\Delta v_2$ subtracted from the second velocity $v_2$, namely $v_2-\Delta v_2$, the transmission interval T is set at the second interval $T_2$ longer than the first interval $T_1$ (refer to FIG. 3 and FIG. 4). This is based on the estimation or prediction that the vehicle 1 is travelling steadily at a high velocity on an express way or the like in the above duration, and consequently, it is acceptable that the transmission frequency of the travel information is low. It is acceptable to use the acceleration a of the vehicle 1 to verify the estimation.

It is defined a velocity range (dead zone) from $v_1$ to ($v_1+\Delta v_1$) in which the transmission interval T will not return from the second interval $T_2$ to the first interval $T_1$ immediately even though the vehicular velocity v being lower than the first velocity $v_1$ is restored to the predefined range (refer to FIG. 3 and FIG. 4). Also, it is defined another velocity range (dead zone) from ($v_2-\Delta v_2$) to $v_2$ in which the transmission interval T will not return from the second interval $T_2$ to the first interval $T_1$ immediately even though the vehicular velocity v being greater than the second velocity $v_2$ is restored to the predefined range (refer to FIG. 3 and FIG. 4). Accordingly, the transmission interval T can be prevented from being switched frequently according to the variation of the vehicular velocity v around the first velocity $v_1$ or the second velocity $v_2$, and consequently, to avoid deteriorating the efficiency of communicating the travel information or the like. This is based on the estimation that the necessity of collecting the travel information will not vary immediately even though the vehicular velocity v is restored to the predefined range from a velocity beyond.

According to the traffic information management server 20, the road traffic information is generated on the basis of the travel information which is collected efficiently from the vehicle 1, and the generated road traffic information is provided to the navigation apparatus 14 mounted in the vehicle 1 or another vehicle 1 (refer to FIG. 2/S222, S224, S226 and S142). Thereby, by making the navigation apparatus 14 search the recommended route on the basis of the road traffic information and output the information thereof to the driver, the driving of the vehicle 1 by the driver can be supported.

The transmission interval T is set in two types, namely, the first interval $T_1$ and the second interval $T_2$; however, it is acceptable to set the transmission interval T in three types or more. In the present embodiment, the transmission interval T when the vehicular velocity v is in the predefined range is set shorter than that when the vehicular velocity v is beyond the predefined range (refer to FIG. 3); however, according to different conditions of the predefined range (for example, different upper limit or lower limit), when the vehicular velocity v is in the predefined range, the transmission interval T may be set longer than that when the vehicular velocity v is beyond the predefined range, which is completely different from the above embodiment. The aforementioned dead zones ($v_1$ to ($v_1+\Delta v_1$), ($v_2-\Delta v_2$) to $v_2$) (refer to FIG. 3 and FIG. 4) may be omitted, thus, when the vehicular velocity v is restored to the predefined range from beyond, the transmission interval T may be switched immediately.

In the aforementioned embodiment, the transmission interval T is set on the basis of the vehicular velocity v denoting the operating state of the vehicle 1; however, it is acceptable to set the transmission interval T on the basis of a parameter different from the vehicular velocity v or an attribute of the vehicle 1. Moreover, it is acceptable to transmit or distribute the rule from the traffic information management server 20 to the traffic information processing apparatus 10. By altering the rule sent to the traffic information processing apparatus from the traffic information management server 20, the transmission interval T can be constantly varied even for the same vehicle 1.

For example, it is acceptable that the second processing element 12 determines parameters denoting the operating state of the vehicle 1, such as the temperature of cooling water for the engine, the ambient air temperature, the remaining amount of fuel, the remaining power of battery, on the basis of outputs of various sensors mounted in the vehicle 1, and sets the transmission interval T on the basis of the determination result.

Also, it is acceptable that the second processing element retrieves information denoting the operating state or attributes of the vehicle 1 from the storing device such as a memory and the rule downloaded from the traffic information management server 20, and sets the transmission interval T according to the attribute information and the rule. The attribute information of the vehicle 1 may include the manufacture date, the vehicular type, the vehicular identification number (VIN), an area where the vehicle 1 is located, parameters denoting the impoverishment degree of the vehicle 1 such as the served years, the accumulated time traveled by the vehicle 1 at a velocity greater than the standard velocity (it can be determined according to a time interlocked with a velocity sensor), accumulated distance (it can be determined by integrating the velocities of the vehicle by a distance sensor interlocked with the velocity sensor) or the deterioration degree of oils, the travel log(denoting when and which link the vehicle 1 traveled) specified by the time and position.

What is claimed is:

1. A traffic information processing apparatus which is mounted in a vehicle and is provided with a first processing element configured to determine travel information of the vehicle and transmit the travel information intermittently, further comprising:

a second processing element configured to set a transmission interval according to an operating state or an attribute of the vehicle for the first processing element to transmit the travel information, wherein the second processing element sets the transmission interval when a velocity of the vehicle denoting the operating state of the vehicle is in a predefined range differently from the transmission interval set when the velocity of the vehicle is beyond the predefined range, the range including a minimum value and a maximum value.

2. The traffic information processing apparatus according to claim 1, wherein the second processing element sets the transmission interval longer when the velocity of the vehicle is beyond the predefined range than that set when the velocity thereof is in the predefined range.

3. The traffic information processing apparatus according to claim 1, wherein the second processing element sets the transmission interval when the velocity of the vehicle varies in a predefined width inside the predefined range different from that when the velocity thereof varies beyond the predefined width after the velocity thereof is restored to the predefined range.

4. The traffic information processing apparatus according to claim 3, wherein the second processing element sets the transmission interval shorter when the velocity of the vehicle varies beyond the predefined width inside the predefined range than that when the velocity thereof varies in the predefined width after the velocity thereof is restored to the predefined range.

5. The traffic information processing apparatus according to claim 1, wherein the second processing element recognizes, according to communication with a traffic information management server, a rule for setting the transmission interval for the travel information according to the operating state or the attribute of the vehicle, and sets the transmission interval according to the operating state or the attribute of the vehicle and the rule.

6. A traffic information management server receives travel information of a vehicle from a traffic information processing apparatus mounted in the vehicle, wherein the traffic information processing apparatus is provided with a first processing element configured to determine travel information and transmit the travel information intermittently, and a second processing element configured to set a transmission interval according to an operating state or an attribute of the vehicle for the first processing element to transmit the travel information, wherein the second processing element sets the transmission interval when a velocity of the vehicle denoting the operating state of the vehicle is in a predefined range differently from the transmission interval set when the velocity of the vehicle is beyond the predefined range, the range including a minimum value and a maximum value, and the traffic information management server is provided with a first management element for making the second processing element recognize a rule for setting the transmission interval for the travel information according to communication with the traffic information processing apparatus.

7. The traffic information management server according to claim 6 further includes a second management element configured to recognize the travel information of the vehicle according to communication with the traffic information processing apparatus, generate road traffic information according to the travel information, and provide the road traffic information to a navigation apparatus mounted in the vehicle or another vehicle.

8. A traffic information management system, comprising:

a traffic information processing apparatus mounted in a vehicle and having:

a first processing element configured to determine travel information of the vehicle and transmit the travel information intermittently, and a second processing element configured to set a transmission interval according to an operating state or an attribute of the vehicle for the first processing element to transmit the travel information, wherein the second processing element sets the transmission interval when a velocity of the vehicle denoting the operating state of the vehicle is in a predefined range differently from the transmission interval set when the velocity of the vehicle is beyond the predefined range, the range including a minimum value and a maximum value; and a traffic information management server that receives travel information of the vehicle from the traffic information processing apparatus and includes a first management element for making the second processing element recognize a rule for setting the transmission interval for the travel information according to communication with the traffic information processing apparatus.

* * * * *